US012347285B2

(12) United States Patent
Grant et al.

(10) Patent No.: US 12,347,285 B2
(45) Date of Patent: Jul. 1, 2025

(54) TETHERED SECURITY SYSTEM WITH WIRELESS COMMUNICATION

(71) Applicant: InVue Security Products Inc., Charlotte, NC (US)

(72) Inventors: Jeffrey A. Grant, Charlotte, NC (US); Jonathon D. Phillips, Fort Mill, SC (US); Gary A. Taylor, Fort Mill, SC (US); Kyle Baker, Waxhaw, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 18/222,095

(22) Filed: Jul. 14, 2023

(65) Prior Publication Data

US 2023/0360505 A1 Nov. 9, 2023

Related U.S. Application Data

(63) Continuation of application No. 17/320,696, filed on May 14, 2021, now Pat. No. 11,741,800, which is a (Continued)

(51) Int. Cl.
*G08B 13/12* (2006.01)
*G08B 13/14* (2006.01)

(52) U.S. Cl.
CPC ................................ *G08B 13/1445* (2013.01)

(58) Field of Classification Search
USPC ......... 340/568.2, 572.1–572.9, 539.1, 568.8, 340/552, 636.19, 691.6, 692, 7.55
See application file for complete search history.

(56) References Cited

U.S. PATENT DOCUMENTS 2,873,822 A 2/1959 Sloan
3,338,077 A 8/1967 Kaneda
(Continued)

FOREIGN PATENT DOCUMENTS

DE 102009049738 A1 4/2011
GB 2363422 A 12/2001
(Continued)

OTHER PUBLICATIONS

"Freedom Micro", 2013, 2 pages, Mobile Technologies Inc., www.mobiletechinc.com, Hillsboro, Oregon, USA.
(Continued)

*Primary Examiner* — Daniel Previl
(74) *Attorney, Agent, or Firm* — InVue Security Products Inc.

(57) ABSTRACT

Embodiments of the present invention are directed to security systems for securing an item of merchandise from theft or unauthorized removal. For example, the security system may include a sensor configured to be coupled to the item of merchandise and a base configured to removably support the sensor and the item of merchandise thereon. The base includes a charging circuit for providing power to the sensor and/or the item of merchandise. The security system also includes a controller operably coupled to the base and a key configured to wirelessly communicate with the base and/or controller. The sensor is configured to wirelessly communicate with the base.

21 Claims, 6 Drawing Sheets

Related U.S. Application Data continuation of application No. 16/733,953, filed on Jan. 3, 2020, now Pat. No. 11,037,417, which is a continuation of application No. 16/388,453, filed on Apr. 18, 2019, now Pat. No. 10,529,201, which is a continuation of application No. 16/110,336, filed on Aug. 23, 2018, now Pat. No. 10,290,192, which is a continuation of application No. 15/803,375, filed on Nov. 3, 2017, now Pat. No. 10,078,945, which is a continuation of application No. 15/260,455, filed on Sep. 9, 2016, now Pat. No. 9,811,988, which is a continuation of application No. 14/618,342, filed on Feb. 10, 2015, now Pat. No. 9,443,404.

(60) Provisional application No. 61/974,058, filed on Apr. 2, 2014, provisional application No. 61/939,954, filed on Feb. 14, 2014.

(56) References Cited

U.S. PATENT DOCUMENTS 3,913,880 A 10/1975 Lucasey et al.
4,305,266 A 12/1981 Lockwood
4,984,098 A 1/1991 Buntsis
5,094,396 A 3/1992 Burke
5,124,685 A 6/1992 Rankin
5,561,417 A * 10/1996 Rothbaum ......... G08B 13/1454 340/568.4
5,685,436 A 11/1997 Davet
5,861,807 A 1/1999 Leyden et al.
6,019,304 A 2/2000 Skowronski et al.
RE37,590 E 3/2002 Leyden et al.
6,380,855 B1 * 4/2002 Ott .......................... A47F 7/024 340/568.4
6,386,906 B1 5/2002 Burke
6,419,175 B1 7/2002 Rankin, VI
6,598,433 B1 7/2003 Malvasio
6,659,382 B2 12/2003 Ryczek
6,756,900 B2 6/2004 Leyden et al.
6,799,994 B2 10/2004 Burke
6,848,282 B2 2/2005 Palzkill et al.
6,859,142 B2 2/2005 Baumeister et al.
6,896,543 B2 5/2005 Fort et al.
7,002,467 B2 2/2006 Deconinck
7,015,596 B2 3/2006 Pail
7,081,822 B2 7/2006 Leyden et al.
7,132,952 B2 11/2006 Leyden et al.
7,135,972 B2 11/2006 Bonato
7,187,283 B2 3/2007 Leyden et al.
7,209,038 B1 4/2007 Deconinck et al.
7,327,276 B1 2/2008 Deconinck et al.
7,403,117 B2 7/2008 Leyden et al.
7,403,119 B2 7/2008 Leyden
7,445,175 B2 11/2008 Leyden et al.
7,593,142 B2 9/2009 Marszalek et al.
7,667,601 B2 2/2010 Rabinowitz et al.
7,701,339 B2 4/2010 Irmscher et al.
7,710,266 B2 5/2010 Belden, Jr. et al.
7,714,722 B2 5/2010 Marszalek et al.
7,724,135 B2 5/2010 Rapp et al.
7,782,207 B2 8/2010 Gillard et al.
7,984,886 B2 7/2011 Lin
7,994,914 B2 8/2011 Irmscher et al.
8,013,740 B2 9/2011 Irmscher et al.
8,081,075 B2 12/2011 Irmscher et al.
8,089,357 B2 1/2012 Irmscher et al.
8,102,262 B2 1/2012 Irmscher et al.
8,106,772 B2 1/2012 Irmscher et al.
8,191,851 B2 6/2012 Crown
8,212,672 B2 7/2012 Brenner
8,314,699 B2 11/2012 Irmscher et al.
8,384,543 B2 2/2013 Tatsumi et al.
8,427,314 B2 4/2013 Billiard
8,542,120 B2 9/2013 Brenner
8,558,688 B2 10/2013 Henson et al.
8,604,927 B2 12/2013 Sisney
8,624,737 B2 1/2014 Irmscher et al.
8,659,426 B2 2/2014 Yunker et al.
8,698,617 B2 4/2014 Henson et al.
8,698,618 B2 4/2014 Henson et al.
8,701,452 B2 4/2014 Foster et al.
9,353,552 B1 5/2016 Kelsch et al.
9,443,404 B2 * 9/2016 Grant ................. G08B 13/1445
9,747,765 B1 8/2017 Berglund et al.
9,761,101 B2 9/2017 Berglund et al.
9,805,564 B1 10/2017 Berglund et al.
9,811,988 B2 * 11/2017 Grant ................. G08B 13/1445
9,928,704 B2 3/2018 Berglund et al.
10,043,358 B1 8/2018 Berglund et al.
10,078,945 B2 * 9/2018 Grant ................. G08B 13/1445
10,127,745 B2 11/2018 Grant et al.
10,210,681 B1 2/2019 Grant et al.
10,258,172 B2 4/2019 Grant et al.
10,290,192 B2 * 5/2019 Grant ................. G08B 13/1445
10,347,061 B2 7/2019 Grant et al.
10,475,308 B2 11/2019 Grant et al.
10,529,201 B2 * 1/2020 Grant ................. G08B 13/1445
11,037,417 B2 * 6/2021 Grant ................. G08B 13/1445
2004/0229498 A1 11/2004 Fort et al.
2005/0234778 A1 10/2005 Sperduti et al.
2006/0097875 A1 5/2006 Ott
2006/0170550 A1 8/2006 Marsilio et al.
2006/0238342 A1 10/2006 Leyden et al.
2007/0159327 A1 7/2007 Belden et al.
2007/0296545 A1 12/2007 Clare
2008/0035778 A1 2/2008 Belden et al.
2008/0142665 A1 6/2008 Belden et al.
2008/0156959 A1 * 7/2008 Fawcett ................ A47F 7/0028 248/551
2008/0204239 A1 8/2008 Marszalek et al.
2009/0033497 A1 2/2009 Wyatt, Jr. et al.
2009/0173868 A1 7/2009 Fawcett et al.
2010/0079285 A1 4/2010 Fawcett et al.
2010/0175438 A1 7/2010 Sankey
2010/0176945 A1 7/2010 Fawcett et al.
2010/0188222 A1 * 7/2010 Irmscher ............ G08B 21/0272 340/568.2
2010/0194568 A1 8/2010 Irmscher et al.
2010/0253519 A1 10/2010 Brackmann et al.
2011/0062294 A1 3/2011 Johnson et al.
2011/0068919 A1 3/2011 Rapp et al.
2011/0133050 A1 6/2011 Eisenberger, Sr. et al.
2011/0187531 A1 8/2011 Oehl et al.
2011/0254661 A1 * 10/2011 Fawcett ............. G08B 13/1445 340/5.61
2011/0303816 A1 12/2011 Horvath et al.
2011/0309928 A1 12/2011 Henson et al.
2011/0309934 A1 12/2011 Henson et al.
2012/0043936 A1 2/2012 Ferguson
2012/0205326 A1 8/2012 Richter et al.
2012/0218109 A1 8/2012 Tatsumi et al.
2012/0235817 A1 9/2012 Forster
2012/0268103 A1 10/2012 Henson et al.
2012/0293330 A1 11/2012 Grant et al.
2013/0026322 A1 1/2013 Wheeler et al.
2013/0098122 A1 4/2013 Eckert et al.
2013/0196530 A1 8/2013 Cheatham et al.
2013/0238516 A1 * 9/2013 Moock ................... G06Q 30/02 705/317
2013/0268316 A1 10/2013 Moock et al.
2014/0015522 A1 * 1/2014 Widmer ................ B60L 53/126 324/239
2014/0022078 A1 * 1/2014 Brenner .................. G09F 27/00 340/568.2
2014/0063238 A1 3/2014 Abdollahzadeh et al.
2014/0118145 A1 5/2014 Wawrzyniak et al.
2014/0118930 A1 5/2014 Sedon
2014/0159898 A1 6/2014 Wheeler et al.
2014/0253332 A1 9/2014 Sayegh et al.
2014/0263873 A1 9/2014 Kim
2014/0298246 A1 10/2014 Tappen et al.
2014/0328020 A1 11/2014 Galant
2015/0049904 A1 2/2015 Sen et al.

(56) References Cited

U.S. PATENT DOCUMENTS

| | | | |
|---|---|---|---|
| 2015/0208826 | A1 | 7/2015 | Yang et al. |
| 2015/0235533 | A1 | 8/2015 | Grant et al. |
| 2015/0305518 | A1 | 10/2015 | Galant |
| 2015/0332386 | A1 | 11/2015 | Pappas et al. |
| 2016/0235217 | A1 | 8/2016 | Johnston et al. |
| 2016/0335859 | A1 | 11/2016 | Sankey |
| 2016/0351029 | A1 | 12/2016 | Fawcett et al. |
| 2016/0379455 | A1 | 12/2016 | Grant et al. |
| 2017/0193780 | A1 | 7/2017 | Moock et al. |
| 2017/0245663 | A1 | 8/2017 | Berglund et al. |
| 2018/0061197 | A1 | 3/2018 | Grant et al. |
| 2018/0240315 | A1 | 8/2018 | Berglund et al. |
| 2018/0365948 | A1 | 12/2018 | Grant et al. |
| 2019/0208926 | A1 | 7/2019 | Grant et al. |
| 2019/0244495 | A1 | 8/2019 | Grant et al. |
| 2019/0272689 | A1 | 9/2019 | Grant et al. |
| 2020/0143641 | A1 | 5/2020 | Grant et al. |

FOREIGN PATENT DOCUMENTS

| | | | |
|---|---|---|---|
| JP | 2006079323 | A | 3/2006 |
| KR | 1020090123334 | A | 12/2009 |
| WO | 2011045058 | A2 | 4/2011 |
| WO | 2014019072 | A1 | 2/2014 |
| WO | 2014078966 | A1 | 5/2014 |

OTHER PUBLICATIONS

"MTI Freedom LP3 Brochure," Mobile Technologies, Inc., dated Sep. 2009 (1 page).

"MTI Freedom LP3 Product Manual," Mobile Technologies, Inc., dated Mar. 2010 (20 pages).

"MTI Freedom LP3 Product Manual," Mobile Technologies, Inc., dated Mar. 2011 (25 pages).

"MTI Freedom LP3 Quick Reference Guide," Mobile Technologies, Inc., dated Feb. 2010 (2 pages).

"MTI Freedom One Product Manual," Mobile Technologies, Inc., dated Jun. 2011 (32 pages).

"MTI Freedom One Product Manual," Mobile Technologies, Inc., dated Jun. 2012 (32 pages).

"MTI Freedom One Sell Sheet," Mobile Technologies, Inc., dated 2012 (2 pages).

* cited by examiner

TETHERED SECURITY SYSTEM WITH WIRELESS COMMUNICATION

CROSS REFERENCE TO RELATED APPLICATIONS

This application is a continuation of U.S. application Ser. No. 17/320,696, filed on May 14, 2021, which is a continuation of U.S. application Ser. No. 16/733,953, filed on Jan. 3, 2020, and now U.S. Pat. No. 11,037,417, which is a continuation of U.S. application Ser. No. 16/388,453, filed on Apr. 18, 2019, and now U.S. Pat. No. 10,529,201, which is a continuation of U.S. application Ser. No. 16/110,336, filed on Aug. 23, 2018, now U.S. Pat. No. 10,290,192, which is a continuation of U.S. application Ser. No. 15/803,375, filed on Nov. 3, 2017, now U.S. Pat. No. 10,078,945, which is a continuation of U.S. application Ser. No. 15/260,455, filed on Sep. 9, 2016, now U.S. Pat. No. 9,811,988, which is a continuation of U.S. application Ser. No. 14/618,342 filed on Feb. 10, 2015, now U.S. Pat. No. 9,443,404, which claims the benefit of the filing dates of U.S. Provisional Application No. 61/939,954 filed on Feb. 14, 2014, and U.S. Provisional Application No. 61/974,058 filed on Apr. 2, 2014, the disclosures of which are incorporated herein by reference in their entireties.

BACKGROUND OF THE INVENTION

Embodiments of the present invention relate generally to security systems for protecting items of merchandise, such as consumer electronics products.

It is common practice for retailers to provide demonstration models of relatively expensive consumer electronics products, such as handheld devices, tablets, and laptop computers, so that a potential purchaser may examine the product more closely and test the operation of its features. A working demonstration model, however, increases the possibility that the demonstration model will be stolen or removed from the display area by an unauthorized person. As a result, demonstration models of consumer electronics products are typically protected by a security system that permits a potential purchaser to examine and operate the product, while reducing the likelihood that the demonstration model will be stolen or removed from the display area.

The security system displays an item of merchandise so that a potential purchaser can readily view and, in some instances, operate the item when making a decision whether to purchase the item. At the same time, the item of merchandise is usually physically secured on the security system so as to prevent, or at least deter, theft of the item. The merchandise display security system may also include an alarm that is activated to alert store personnel in the event that a shoplifter attempts to separate the item of merchandise from the security system.

BRIEF SUMMARY

Embodiments of the present invention are directed to security systems for securing an item of merchandise from theft or unauthorized removal. In one embodiment, the security system includes a sensor configured to be coupled to the item of merchandise and a base configured to removably support the sensor and the item of merchandise thereon. The base includes a charging circuit for providing power to the sensor and/or the item of merchandise. The security system also includes a controller operably coupled to the base and a key configured to wirelessly communicate with the base and/or controller. The sensor is configured to wirelessly communicate with the base.

In one embodiment, the security system may include a sensor configured to be coupled to the item of merchandise and a base configured to removably support the sensor and the item of merchandise thereon. The base may also include a charging circuit for providing power to the sensor and/or the item of merchandise. The system may further include a cable connected to the sensor and the base, wherein the cable includes at least one conductor for defining a sense loop and the charging circuit and the sense loop are electrically isolated from one another.

In another embodiment, a security system for securing an item of merchandise is provided. The security system includes a sensor configured to be coupled to the item of merchandise and a base configured to removably support the sensor and the item of merchandise thereon. The base includes a charging circuit for providing power to the sensor and/or the item of merchandise when the sensor is supported on the base. In addition, the security system includes a cable connected to the sensor at one end and connected to the base at an opposite end, wherein the cable includes at least one conductor for defining a sense loop. The sensor is configured to wirelessly communicate with the base, and the base is configured to generate an alarm signal in response to the wireless communication with the sensor or an interruption in the sense loop.

In another embodiment, a method for securing an item of merchandise is provided. The method includes coupling a sensor to an item of merchandise and connecting a cable to the sensor for defining a sense loop between the sensor and a base. The method also includes positioning the sensor on the base for removably supporting the sensor and the item of merchandise thereon, wherein the base includes a charging circuit for providing power to the sensor and/or the item of merchandise and configured to wirelessly communicate with the sensor. The base is configured to generate an alarm signal in response to wireless communication with the sensor or an interruption in the sense loop In one embodiment, a method for securing an item of merchandise is provided. The method includes coupling a sensor to an item of merchandise and connecting a cable to the sensor for defining a sense loop between the sensor and a base. The method also includes positioning the sensor on the base for removably supporting the sensor and the item of merchandise thereon, wherein the base includes a charging circuit for providing power to the sensor and/or the item of merchandise. The charging circuit and the sense loop are electrically isolated from one another.

DETAILED DESCRIPTION OF EMBODIMENTS OF THE INVENTION

Figure 1:
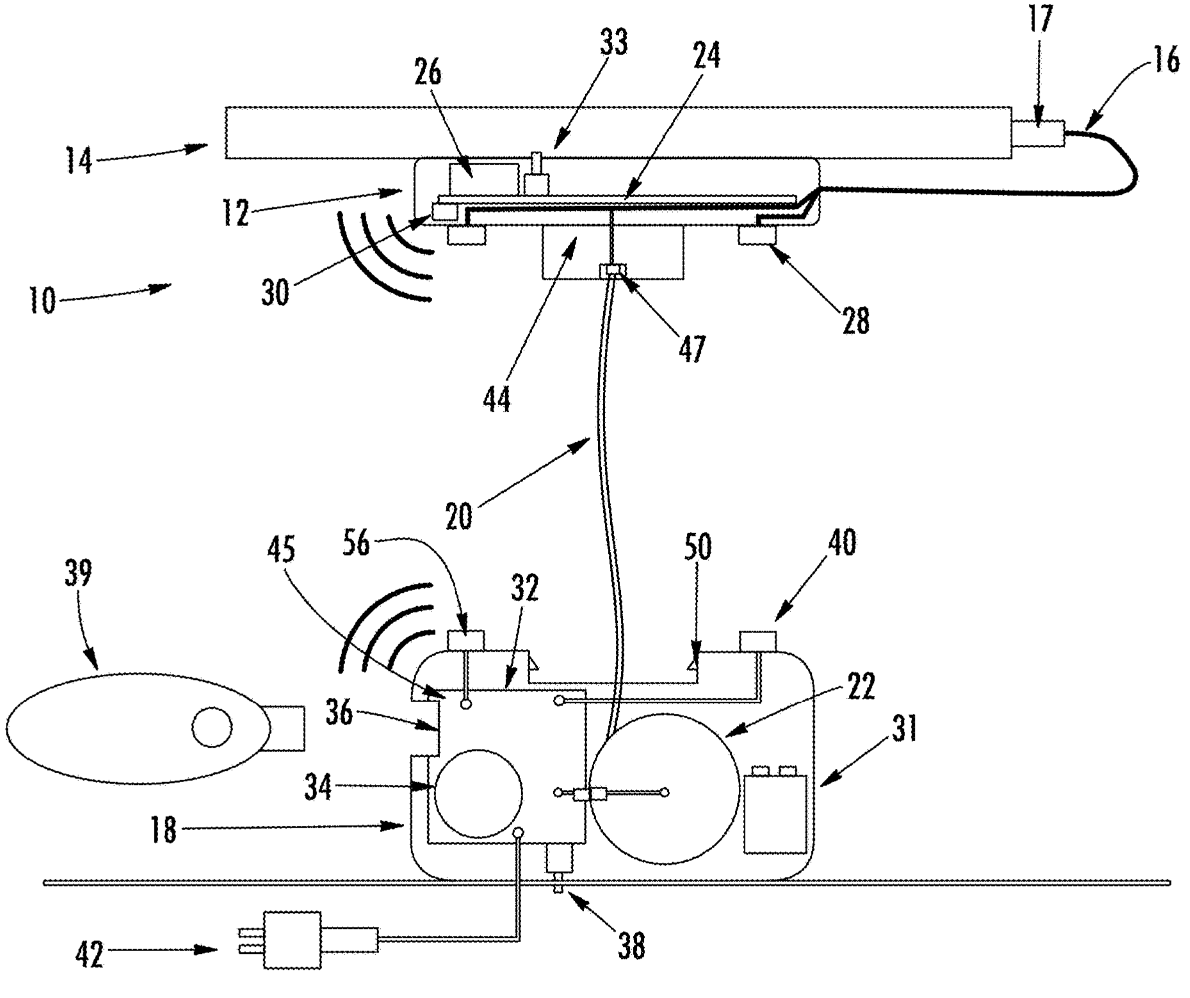
FIG. 1 is a schematic of a security system according to one embodiment of the present invention.
Figure 2:
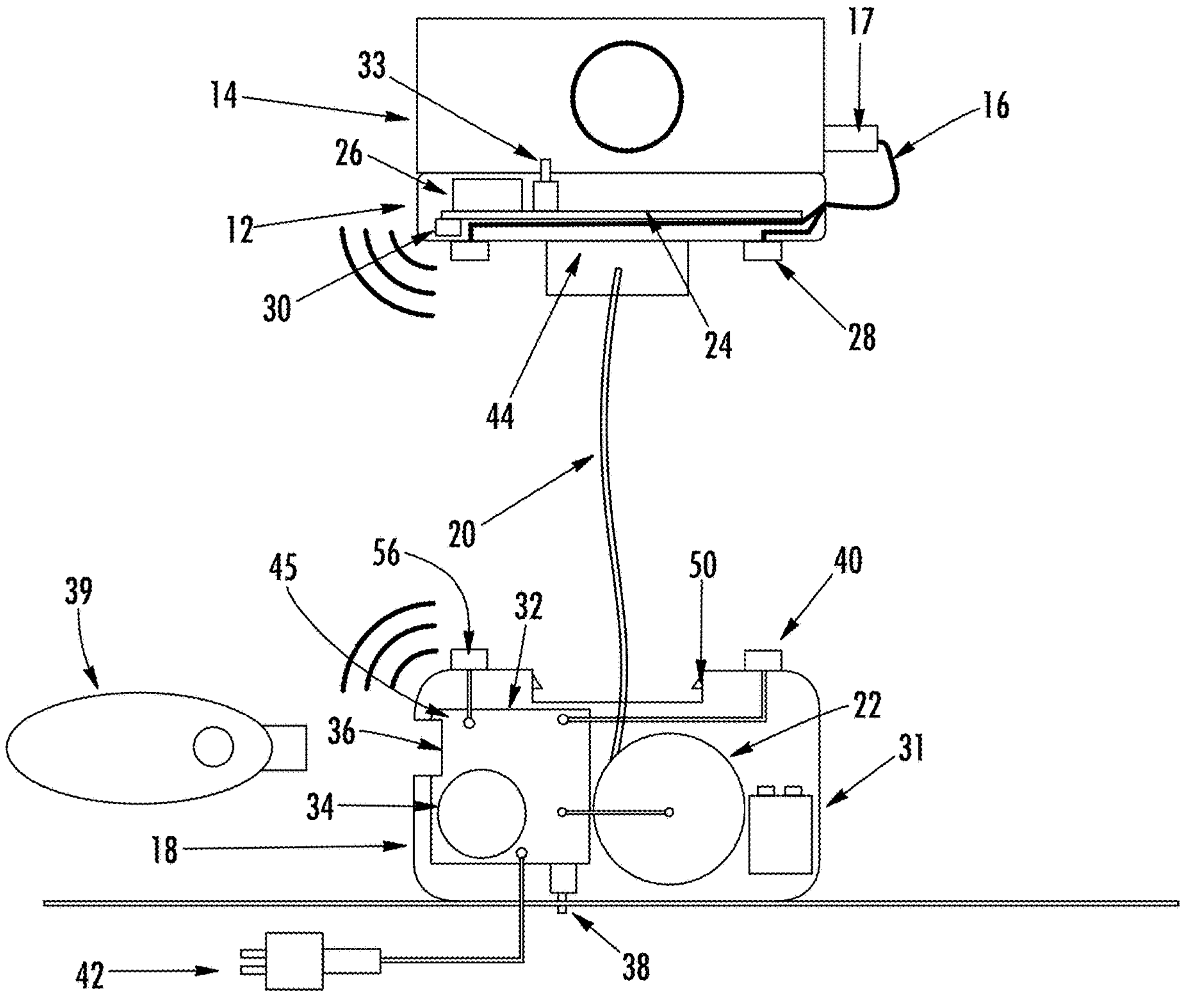
FIG. 2 is a schematic of a security system according to another embodiment of the present invention.
Figure 3:
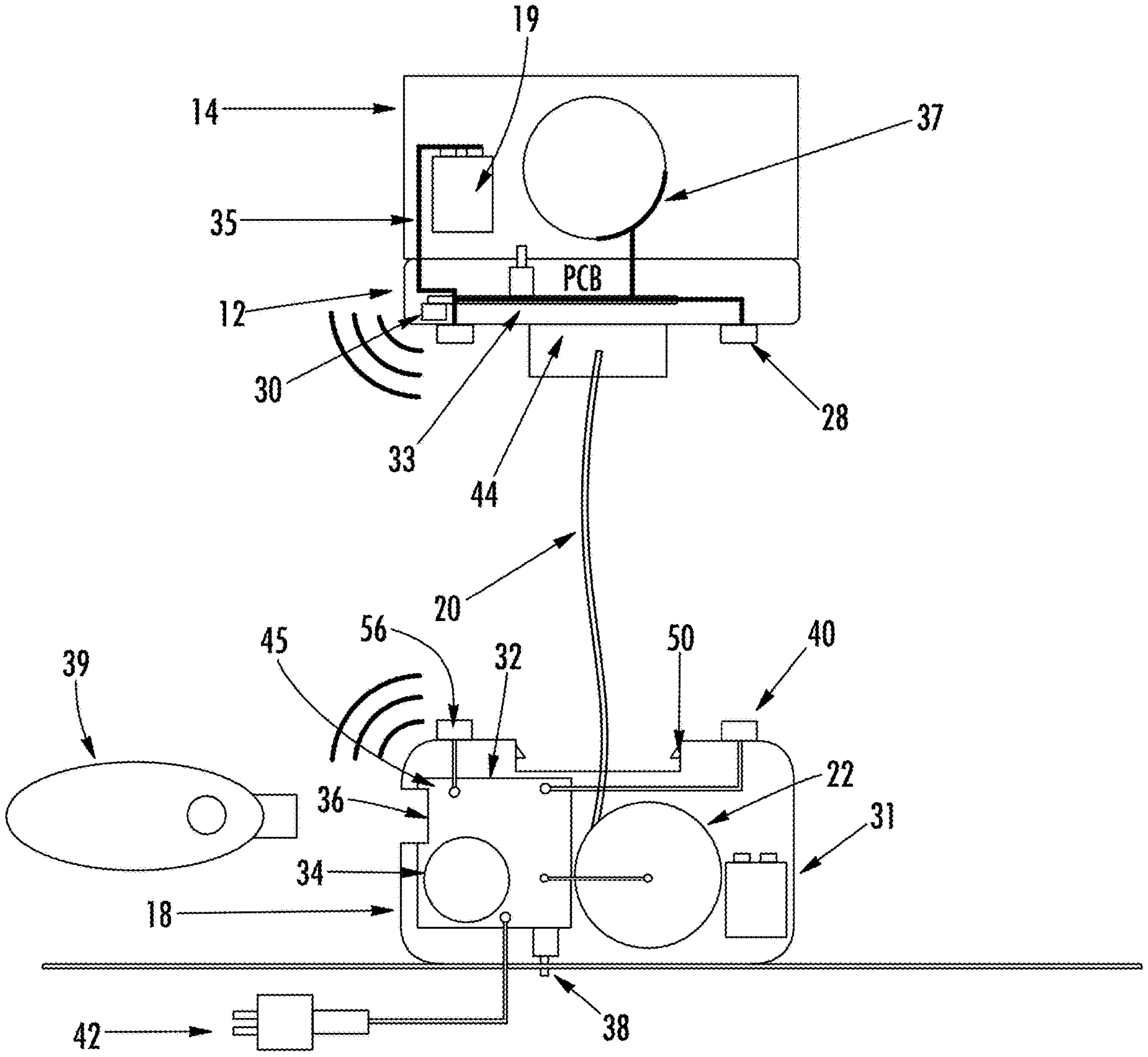
FIG. 3 is a schematic view of a security system according to an additional embodiment of the present invention.

Referring to the accompanying figures wherein identical reference numerals denote the same elements throughout the various views, embodiments of security systems according to the present invention for protecting an item of merchandise against theft or unauthorized removal are disclosed. The item of merchandise may be any item, including any number of consumer electronics products (e.g. hand-held device, cellular phone, smart phone, tablet, laptop computer, etc.). The security systems described herein are operable for securing the item of merchandise against theft or authorized removal, while at the same time permitting a potential purchaser to closely examine and operate the item of merchandise in a display area. The security system permits a potential purchaser to examine and test the item of merchandise, while reducing the likelihood that the item of merchandise will be stolen or removed from the display area by an unauthorized person. According to various embodiments, FIG. 1 shows a security system for use with a handheld electronic device (e.g., a phone or tablet), FIG. 2 shows a security system for use with a camera (e.g., a point-and-shoot camera), and FIG. 3 shows a security system for use with a camera (e.g., a camera with a removable lens). The systems shown and described herein are suitable for securing an item of merchandise in a residential or commercial environment, as well as a retail environment, and furthermore, is not intended to be limited to use only as a security display device for protecting against theft and/or unauthorized removal.

According to one embodiment shown in FIG. 1, the security system 10 generally comprises a sensor 12 configured to be secured to an item of merchandise 14. The sensor 12 may be electrically connected to an adapter cable 16 with a connector 17 that is configured to electrically connect to an input jack of the item of merchandise 14. The security system 10 may also include a base 18 that is configured to removably support the sensor 12 and the item of merchandise 14 thereon. In some embodiments, the base 18 and the sensor 12 include one or more contacts 28, 40 for facilitating contact charging when the sensor is supported on the base. In addition, the security system 10 also includes a cable 20 that is secured to the sensor 12 at one end and operably engaged with a recoiler 22 at an opposite end. As explained in further detail below, a sense circuit or loop defined through the cable 20 may be electrically isolated from any charging circuit used to charge the sensor 12 and/or the item of merchandise 14. As such, the sense loop may be used to detect various security events associated with the cable 20, such as the cable being cut, shorted, and/or disconnected. The charging circuit allows for charging of the item of merchandise 14 and/or power source carried by the sensor 12. The sensor 12 may detect security events associated with the sensor and/or the item of merchandise 14, such as the item of merchandise being removed from the sensor.

The sensor 12 may be secured to the item of merchandise 14 using any desired technique, such as an adhesive and/or mechanical brackets. In addition, the adapter cable 16 may be hardwired to the sensor 12 at one end, and the connector 17 at the opposite end may be configured to be removably inserted into the input jack of the item of merchandise 14. Thus, the sensor 12 and the item of merchandise 14 may be electrically connected via the adapter cable 16 and connector 17. The sensor 12 may include a printed circuit board (PCB) 24, circuitry, or the like. Moreover, the sensor 12 may include a power source 26, such as a battery or capacitor. As noted above, the sensor 12 may include one or more electrical contacts 28. In some embodiments, the sensor 12 includes a plurality of electrical contacts 28. The electrical contacts 28 may be in electrical communication with the PCB 24 and the adapter cable 16. Alternatively, the electrical contacts 28 may be electrically connected to only the adapter cable 16.

In some embodiments, the sensor 12 may not supply power to the item of merchandise 14 when the item is lifted from the base 18. Rather, the item of merchandise 14 may operate using its own power source when lifted from the base 18. Should a security event occur, the sensor 12 may utilize its power source 26 to generate a security signal as explained in further detail below.

In one alternative embodiment, the sensor 12 may be configured to receive power from a battery of the item of merchandise 14. The sensor 12 may utilize the power provided from the battery to perform one or more security functions (e.g., communicating with the base 18). Thus, unlike conventional sensors 12 that utilize its own power source, the sensor may be configured to utilize the power source of the item of merchandise 14. In some embodiments, the sensor 12 may be configured to toggle between transmitting and receiving power to an item of merchandise 14. In another example, the item of merchandise 14 may utilize USB "on-the-go" or like functionality for facilitating power transfer from the item of merchandise to the sensor 12. The sensor 12 may be configured to toggle to receiving power from the item of merchandise 14 when the sensor is lifted from the base 18 and is no longer receiving power.

Moreover, the sensor 12 may include wireless communication circuitry 30 for communicating with the base 18. As explained in further detail below, the wireless communication circuitry 30 may be configured to wirelessly communicate with the base 18 in response to a security event. For example, a security event may occur when the sensor 12 is removed from the item of merchandise 14 in an unauthorized manner, or the adapter cable 16 is removed from the item of merchandise in an unauthorized manner. In some embodiments, the sensor 12 includes a switch 33 (e.g., a plunger switch) that is configured to detect when the sensor is removed from the item of merchandise 14 in an unauthorized manner.

FIG. 3 shows another embodiment of a security system. The embodiment shown in FIG. 3 may be used for items of merchandise 14 such as cameras or the like and function in a similar manner as that described above. In this embodiment, the sensor 12 includes an electrical coupling 35 between the electrical contacts 28 and the battery 19 of the item of merchandise 14. The electrical coupling 35 may be in various forms, such as a flexible circuit or a cable including one or more conductors. Thus, power may be transferred directly to the battery 19 of the item of merchandise 14 when the sensor 12 is supported on the base 18. Moreover, the sensor 12 may also include a secondary sensor 37. The secondary sensor 37 could be used to protect a removable component of the item of merchandise 14, such as a removable lens. In some embodiments, the electrical coupling and the secondary sensor are similar to that described in U.S. Provisional Application No. 61/915,197, filed on Dec. 12, 2013, and International Application No. PCT/US2014/62768, filed on Oct. 29, 2014, the contents of which are hereby incorporated by reference in their entirety herein.

The base 18 may be configured to be supported on a fixed support or display surface, such as a counter, shelf, fixture, or the like. Thus, the base 18 may be located entirely above the support surface. The base 18 may be secured to the support surface using any desired technique such as an adhesive and/or fasteners. The base 18 may include a recoiler 22 as discussed above. As such, the cable 20 may be extended from the base 18 when the sensor 12 and the item of merchandise 14 are lifted from the base, and the cable may be retracted into the base when the sensor and the item of merchandise are returned to the base. The recoiler 22 may be spring biased in some embodiments such that the cable 20 is automatically retracted within the base 18. Furthermore, the base 18 may include a PCB 32, circuitry, or the like that is in electrical communication with the cable 20. In this regard, the cable 20 may include one or more electrical conductors extending along the length of the cable. In some cases, the cable 20 may include a pair of conductors for defining a sense loop or circuit and conducting an electrical signal. In other cases, the cable 20 may include a single conductor, such as an optical conductor for conducting an optical signal (e.g., a fiber optic cable).

The base 18 may further include an alarm mechanism 34, such as a piezoelectric transducer, for generating an audible alarm in response to a security event. The base 18 may also include a battery 31 or power source that is in electrical communication with the PCB 32. The base 18 may include a port 36 that is configured to facilitate communication with a key 39. For example, the port 36 may facilitate wireless communication with a key 39 for arming or disarming the security system 10. In one embodiment, the key 39 is an infrared key configured to arm/disarm the alarm with a unique identifying code. In some embodiments, the key 39 is similar to the IR and IR2 keys manufactured by InVue Security Products Inc. The base 18 may include a switch 38 (e.g., a plunger switch) that is configured to detect when the base is removed from the support surface in an unauthorized manner. As such, the security system 10 may be a "stand-alone" system that is configured to detect various security events and configured to be supported on a display surface.

As discussed above, the base 18 may include one or more electrical contacts 40. The contacts 28, 40 of the base 18 and the sensor 12 are configured to align with one another and contact one another when the sensor is supported on the base. Thus, the base 18 and the sensor 12 are in electrical communication with one another when the sensor is supported on the base. The base 18 may be electrically connected to a power source 42 which is configured to provide power to the base and the one or more electrical contacts 40 in the base. The power source 42 may include a connector at a free end (e.g., a USB or like plug). The base 18 may also include charging circuitry 45 that is configured to facilitate power transfer from the external power source 42 and the electrical contacts 40. Thus, when the sensor 12 is supported on the base 18, power is able to be transferred between the contacts 28, 40 and to the sensor. The adapter cable 16 is electrically connected to the sensor contacts 28 as power is delivered such that power is provided to the item of merchandise 14. Therefore, the item of merchandise 14 may be powered by power transferred thereto and may be used to charge a battery associated with the item of merchandise. In some embodiments, any voltage adaption occurs in the base 18. Voltage adaption may be needed in order to accommodate different items of merchandise 14 that require different operating voltages. Any voltage adaption may occur prior to power being provided to the contacts 28 on the sensor 12. Thus, the sensor 12 and adapter cable 16 do not provide any voltage adaption. In one embodiment, the adapter cable connector 17 may include an LED or visual indicator that is activated when the item of merchandise 14 is being charged. The LED may be deactivated when the sensor 12 is lifted from the base 18.

In some cases, the base 18 and the sensor 12 may include an electrical contact that detects that the sensor is lifted off of the base. For example, the sensor 12 and base 18 may each include a contact that is configured to engage one another when the sensor is supported on the base. These contacts may not transfer power. However, the contact on the base may communicate with the PCB 32 to indicate when the sensor 12 has been lifted off of the base and to cease transferring power to the electrical contacts 28, 40. This arrangement of contacts may reduce arcing and power surges when the sensor 12 is placed back on the base 18 since power will no longer be transferred to the contacts on the base after the sensor is lifted.

An end of cable 20 may be mechanically secured to the sensor 12. Thus, the cable 20 is not electrically connected to the sensor 12 in any way, and the conductors in the cable are electrically isolated from the power transmitted to the sensor and the item of merchandise 14. In one example, the cable 20 may be attached to the sensor 12 with a swivel 44 or like connector (e.g., an audio jack connector) to allow for rotational movement between the sensor and the cable. The swivel 44 could be permanently attached to the sensor 12 or could be removably attached if desired. In some embodiments, the sensor 12 may include a capacitor to aid in the transition between a position where the item of merchandise 14 and/or sensor 12 are being charged to a position where the item of merchandise and/or sensor are no longer being charged. Thus, a false alarm may be avoided if power is lost momentarily when power to the sensor is transitioned between power sources. Although the aforementioned embodiments describe that power may be transferred via contact charging, it is understood that other techniques could be used to transfer power to sensor 12 and the item of merchandise 14. For example, inductive charging functionality could be employed for transferring power.

As discussed above, the sensor 12 may be configured to emit a wireless signal in response to a security event. In one embodiment, the base 18 may include wireless communication circuitry 56 that is configured to communicate with the wireless communication circuitry 30 of the sensor 12. For example, the base 18 may be configured to receive the wireless signal emitted by the sensor 12 and to generate an alarm signal (e.g., an audible and/or a visible alarm) in response thereto. In some embodiments, the sensor 12 includes a radio transmitter that is configured to emit a signal at a frequency that is detectable by a radio receiver in the base 18. Upon receipt of the signal, the base 18 would generate an alarm signal. Other wireless communication techniques are possible such as, for example, Bluetooth, Bluetooth low energy (BLE), WiFi, or the like. The base 18 may be configured to "listen" for the wireless signal emitted by the sensor 12 and generate an alarm signal upon receiving the signal. Thus, in some bases, one-way communication from the sensor 12 to the base 18 occurs.

In one embodiment, the sensor 12 and the base 18 are configured to be paired with one another. For example, the sensor 12 may include a unique identifier (e.g., a serial number) that is communicated to the base 18, such as via respective wireless communication circuitry 30, 56. The sensor 12 may be configured to emit a signal to the base 18 whereby the base recognizes the sensor's identifier. Thus, no alarm signal is generated when the base 18 is receiving the signal from the sensor 12. However, the base 18 may be configured to detect when the signal is no longer received and to generate an alarm signal in response thereto. In one example, the sensor 12 and base 18 may be paired with one another when the sensor is supported on the base. This pairing may occur each time the sensor 12 is placed on the base 18. Pairing between a sensor 12 and base 18 may reduce false alarms and cross talk between other sensors and bases that are proximate to one another.

In another embodiment, a central controller may be employed that is configured to communicate with a plurality of sensors 12 and/or bases 18. For example, the central controller may be configured to wirelessly communicate with a plurality of sensors 12 having unique identifiers. The controller may be paired with each of the sensors 12 and be configured to generate an alarm signal when communication with a sensor is lost. The controller may also generate an alarm signal if the sensor 12 emits a security signal to indicate that an alarm event has occurred (e.g., the sensor is removed from the item of merchandise 14). The controller may also be configured to communicate with a respective base 18 so that the base may generate an alarm signal when communication with an associated sensor 12 ceases or when the sensor emits a security signal. In other embodiments, the controller may be integrated with the base 18.

It is understood that the cable 20 may be any suitable cord, tether, or the like. In addition, the cable 20 may include one or more electrical conductors for transmitting electrical, security, and/or communication signals. In addition, the cable 20 may be a single strand, multi-strand, or braided. The cable 20 may be flexible to facilitate extension and retraction with the base 18, and in some embodiments, may be formed of a cut-resistant material. Furthermore, the cable 20 may have various cross sections, such as round or flat. In some embodiments, the security system 10 may not include a recoiler 22. Thus, the cable 20 could be a straight or coiled cable that is secured to the sensor 12 at one end and electrically connected to base 18 at an opposite end.

Various sensing techniques may be employed for determining whether the cable 20 has been cut or removed from the sensor 12 in an unauthorized manner. For example, the cable 20 may include a pair of electrical conductors that define a sense loop therethrough. Thus, should the sense loop be interrupted (e.g., by cutting or shorting the cable 20), the PCB 32 in the base 18 may detect the interruption and generate an alarm signal. In some embodiments, a resistor may be disposed within the sense loop at an end of the cable 20 secured to the sensor 12. Changes in the resistance may be used to determine whether the cable 20 has been cut or shorted. For example, a range of resistance values between the cable 20 being shorted and the cable fully extended from the base 18 may be used to determine resistance values indicative of cutting or shorting.

Figure 4:
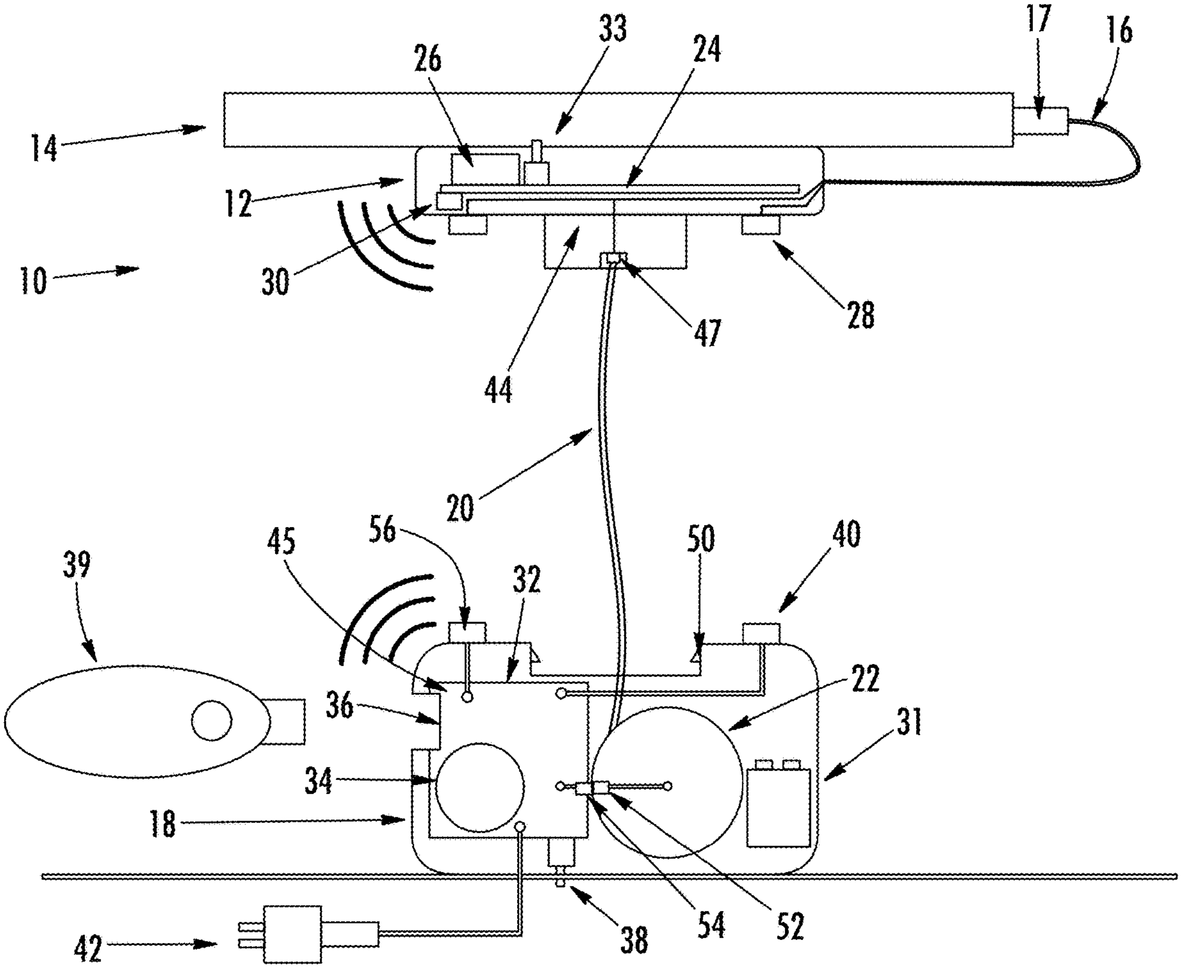
FIG. 4 is a schematic view of a security system according to one embodiment of the present invention.

In an additional embodiment, an end of the cable 20 operably engaged with the recoiler may include an inductive coil 52, and the base may also include an inductive coil 54 (see, e.g., FIG. 4). The inductive coils 52, 54 may be configured to communicate via inductance to establish a sense loop through the cable 20. In one example, the inductive coil 54 in the base is stationary, while the other inductive coil 52 is coupled to the recoiler 22 and is configured to rotate about the stationary inductive coil as the cable 20 is extended and retracted. The stationary inductive coil 54 could be sized and configured to be positioned within the recoiler inductive coil 52 such that the rotating inductive coil surrounds the stationary inductive coil. However, the inductive coils 52, 54 only need to be positioned proximate to one another to allow for inductive communication. As such, the stationary 54 and recoiler 52 inductive coils are configured to be in electrical communication with one another. As current is transmitted through the recoiler inductive coil 52, an inductance is transmitted to the stationary inductive coil 54 and through the conductors in the cable 20. This inductance may be in the form of a particular waveform. If the cable 20 is cut or shorted, a change in inductance or the waveform may be detected by the base 18. The base 18 may then generate an alarm signal in response to the change in inductance. In some embodiments, the end of the cable 20 secured to the sensor 12 may include a resistor or a capacitor defined in the sense loop. The resister or capacitor may be used to detect security events, such as an authorized person attempting to short the cable between the ends of the cable 20.

The sensor 12 may include an additional pressure switch 47 that is configured to operably engage an end of the cable 20 (see, e.g., FIG. 1). For instance, the sensor 12 may include a pressure switch 47 that is configured to engage the end of the cable 20 when the cable is secured to the sensor. The pressure switch 47 may be electrically connected to the sensor's PCB 24 such that should the end of the cable 20 be removed in an unauthorized manner, the sensor 12 may detect the removal and be configured to emit a wireless signal to the base 18 to generate an alarm signal. Notably, this pressure switch 47 is also electrically isolated from the cable 20, as the pressure switch may be a mechanical engagement with the cable only. Moreover, is understood that various types of switching devices may be used that allows the PCB 24 to detect when the cable 20 is attached or detached from the sensor 12.

In an alternative embodiment, the end of the cable 20 secured to the sensor 12 may not include a resistor or capacitor. Rather, the end of the cable 20 may include an inductive coil that is configured to electrically communicate with an inductive coil in the sensor 12. Thus, in this embodiment, a pair of inductive coils may be provided at the sensor 12 level and at the base 18 level. When the sensor 12 is lifted from the base 18, power for driving the sensor inductive coil may be provided by the battery of the item of merchandise 14 or the capacitor. As such, electrical communication between the sensor 12 and inductive coils and interruption in the communication is detectable when the inductive transfer is interrupted.

A separate lock mechanism 50 may be disposed within the base 18 for locking the base to the sensor 12 to prevent the sensor and item of merchandise 14 from being lifted from the base. For example, a fastener may be used to secure the base 18 to the sensor 12. Such a lock may be employed after hours in a retail environment to prevent unauthorized removal and further security of the item of merchandise 14, as the cable 20 will be inaccessible. It is also understood that the lock mechanism 50 could incorporate electro-mechanical means for locking the sensor 12 to the base 18. In one example, the lock mechanism 50 could be actuated in response to communication with a key 39. For example, in some embodiments, a shape memory material (e.g., Nitinol) may be used in connection with a lock mechanism 50. For example, electrical power provided by the key 39 may be transferred to the lock mechanism 50 for causing a change in shape in the shape memory material (e.g., a change in length), thereby actuating a mechanical lock mechanism. In one example, where a shape memory material is utilized, a change in shape of the shape memory material may cause mechanical actuation (e.g., linear and/or rotary movement) of the lock mechanism 50. The shape memory material may be operably engaged with a lock mechanism 50 in any number of configurations to facilitate such actuation. Moreover, the shape memory material may be any suitable material, such as a metal, a polymer, or a combination thereof, that is configured to change its shape (e.g., length, area, etc.) in response to an electric current or a change in temperature and to return to its original shape after the electric current is no longer transferred therethrough. For example, transferring current through the shape memory material may cause the material to be heated and thereby contract. Upon removal of the current, the shape memory material may return to its original shape. In some embodiments, the lock mechanism 50 may utilize shape memory material and be similar to that disclosed in in U.S. application Ser. No. 14/328,051, entitled Merchandise Security Devices for Use with an Electronic Key, the contents of which are hereby incorporated by reference in their entirety herein.

Therefore, embodiments of the present invention may provide several advantages. As noted above, the sense loop and the charging circuit may be electrically isolated from one another. Because the cable 20 does not require conductors for transferring power, the cable may only require one or two conductors, which reduces the overall diameter of the cable. In addition, since the conductor(s) in the cable 20 are electrically isolated from the charging circuit and any voltage adaption may occur in the base 18, the cable may also be simplified in construction in order to define a sense loop. It is also possible that a greater effective length of cable 20 may be used for a similarly sized recoiler 22 since a smaller diameter wire may be used. Moreover, the pull force required to extend the cable 20 from the recoiler 22 may also be reduced in view of larger cables (e.g., less than 1 lb). Moreover, the base 18 may not require a slip ring for electrically communicating with the recoiler 22 and the cable 20. Similarly, no slip may be required for electrical communication between the sensor 12 and the end of the cable 20 since only a mechanical connection takes place. It is also possible that less "wear and tear" may take place on the cable 20, sensor 12, and base 18 since lighter and smaller components may be used.

Figure 5:
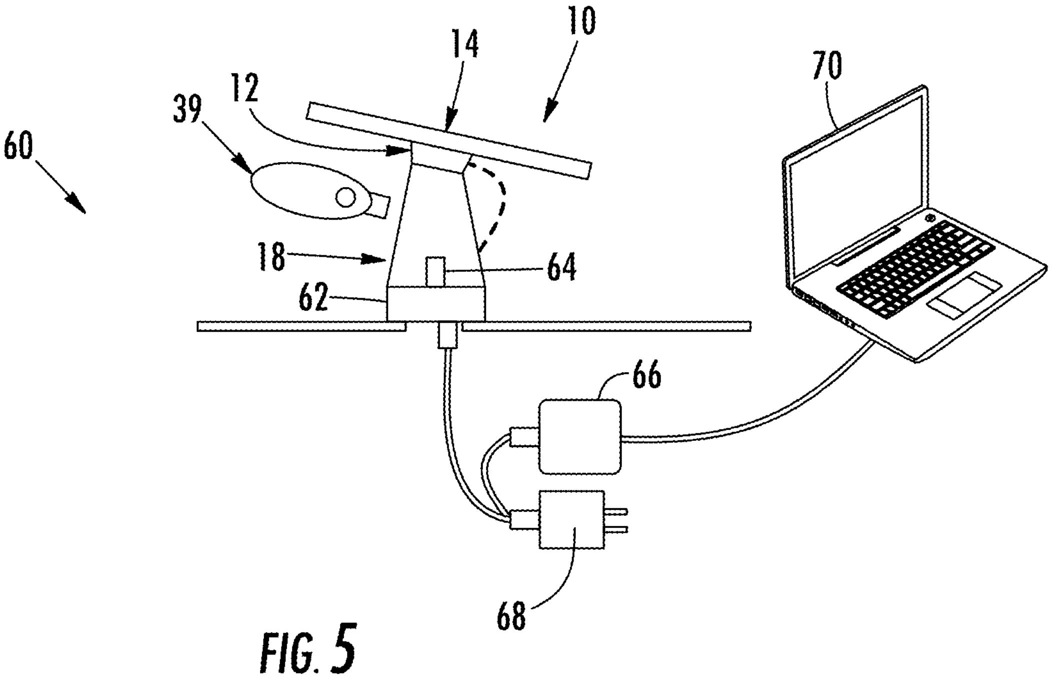
FIG. 5 is a schematic view of a security system according to an embodiment of the present invention.

FIG. 5 illustrates an additional embodiment of a security system 60. The security system 60 may include a security system 10 similar to that discussed above in FIGS. 1-4, including a sensor 12 and a base 18. FIG. 5 demonstrates that various add-on features may be utilized with the security systems discussed above. For example, the security system 60 may include a hub 62 configured to operably engage a stand 18. The hub 62 may include an interface (e.g., a plug connector) that is configured to releasably engage the stand 18, such as an input port 64, and to provide electrical communication therebetween. It is understood that such a connection between the hub 62 and the base 18 may be reversed in some embodiments. The hub 62 may be located such that a bottom surface of the base 18 may be positioned on the hub and supported thereby. Thus, the hub 62 may be positioned between the base 18 and the support surface, or the hub could be positioned below the support surface. In some cases, the base 18 may engage the hub 62 and be sized such that the hub is inaccessible when the base is engaged with the hub. In one example, the base 18 could include a port (e.g., a micro-USB or USB-A port) that is configured to engage a corresponding connector on the hub 62 (e.g., a micro-USB or USB-A connector). When the base 18 is connected to the hub 62, electrical, data, security, and other signals may be able to be transferred therebetween. The hub 62 may allow for ready replacement of the base 18 or an entire security system 10. Thus, retailers may be able to easily replace, repair, remove, and swap security systems 10 or components thereof. And as such, the hub 62 may facilitate a modular system that is capable of use with a plurality of security systems 10.

As shown in FIG. 5, the hub 62 may further be operably engaged with a digital interface box ("DIB") 66 or like controller and a power source 68 (e.g., an OEM power source). The DIB 66 and power source 68 may be configured to releasably engage the hub 62 and/or stand 18, such as below a support surface, although hard wiring or other connections may be used. The power source 68 may transmit power to the hub 62 which allows for power to be transmitted to the system 10. The DIB 66 may facilitate data communication with the system 10. For example, the DIB 66 may be operably engaged with a laptop 70 or other electronic device configured to provide data regarding an item of merchandise 14 for digital signage. The laptop 70 may be managed by a retailer. Likewise, the DIB 66 may be configured to obtain data regarding the item of merchandise 14 and provide the data to the laptop 70. For instance, the data may be the number of pickups of the sensor 12 off of the base 18, the number of put downs of the sensor onto the base, the power status of the item of merchandise 14, the lock down status of the system 10, the alarm status of the system, the power level of a back-up battery in the sensor and/or base, etc. In addition, the DIB 66 may be configured to receive data from a security system 10 that results in performance of a particular function, such as directing a camera to record the location of an alarming system 10 or actuating digital signage. It is understood that the hub 62 may be omitted in some embodiments. Thus, the DIB 66 and/or power supply 68 may be configured to connect directly to the base 18 (e.g., via port 64).

Figure 6:
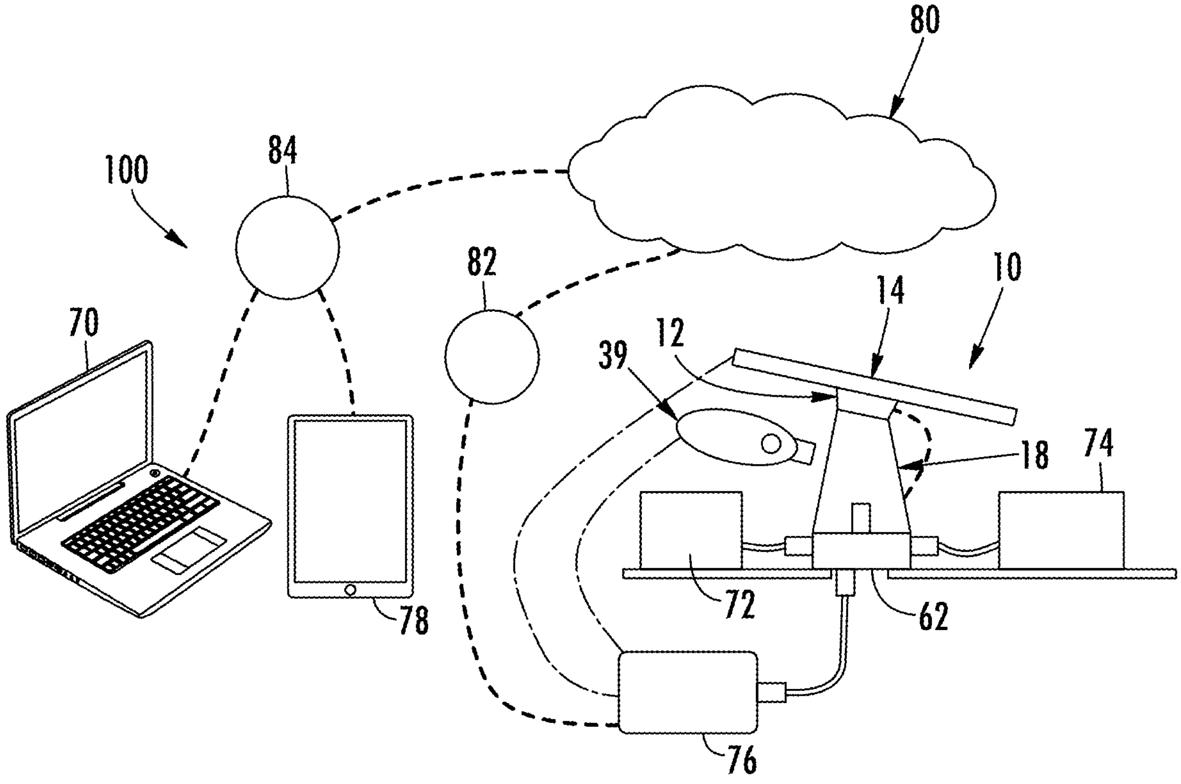
FIG. 6 is a schematic view of a security system according to another embodiment of the present invention.

FIG. 6 shows another embodiment of a security system 100. The security system 100 may also be configured to operate with the security systems 10 discussed above. As shown in this embodiment, the hub 62 may also be operably engaged with other optional features, such as a motion sensor 72 and a digital price tag 74. The motion 72 sensor could be used for detecting when the sensor 12 is lifted off of the base 18, such as for triggering digital signage for providing information regarding the item of merchandise M. The motion sensor 72 could also be configured to detect when a customer or potential buyer approaches a security system 10, such as for actuating digital signage or other features. The digital price tag 74 could be used to display various features of the item of merchandise 14, such as a price of the item, and may be used in conjunction with the motion sensor 72 to display various features associated with the item of merchandise.

FIG. 6 also shows that the system 100 may include an integrated DIB and power supply 76 that may be configured to wirelessly communicate with the item of merchandise 14, the sensor 12, and/or the key 39. Of course, the DIB/power source may be separate components if desired. The DIB/power supply 76 may be configured to communicate with one system 10 or in some cases, may be configured to communicate with a plurality of systems 10. In one embodiment, the item of merchandise 14, key 39, and DIB/power supply 76 may be wirelessly paired with one another (e.g., via BLE). The key 39 may be configured to communicate with the DIB/power source to perform arming/disarming functions and/or a lock down function, as discussed above. Moreover, the item of merchandise 14 may be configured to communicate directly with the DIB/power source 76. For example, the item of merchandise 14 may include a software application that allows for communication with the DIB/power source 76.

In some embodiments, the DIB/power source 76 may be configured to communicate with a retailer's laptop 70, tablet 78, or like electronic device through a cloud network 80. In one particular embodiment, a plurality of DIB/power supplies 76 and/or systems 10 are configured to communicate with one or more retailer's electronic devices 70, 78 over the network 80. For instance, the cloud network 80 may facilitate communication with a plurality of tablet devices 78 used by sales associates within a retail environment. Communication over the network 80 may occur wirelessly (e.g., via radiofrequency communication). One or more gateways and/or nodes may be used to facilitate communication between the DIB/power supply 76 and the retailer's electronic device(s) 78. For instance, a gateway 84 (e.g., a router) between the DIB/power supply and the cloud network 80 may be configured to facilitate communication with a retailer's gateway 82 and may be configured to allow the retailer to provide and receive data from the system 10. The retailer may be able to direct various commands via the cloud network 80 such as, for example, ensuring planogram compliance. In some embodiments, such commands could include powering up or down one or more items of merchandise 14, performing a roll call of one or more items of merchandise (either at a particular time or after an alarming event), determining a location of an alarming system 10, identifying a specific key that armed/disarmed/locked/unlocked a particular system 10, remotely enabling or disabling an item of merchandise, remotely locking down an item of merchandise, checking the power status of an item of merchandise, tracking usage of an item of merchandise, tracking one or more items of merchandise (e.g., via serial number), assigning particular keys 39 to authorized users, and/or directing a camera to record the location of an alarming system 10. As such, a retailer may be able to more effectively manage any number of features regarding one or more security systems 10.

The foregoing has described one or more embodiments of security systems for securing an item of merchandise from theft or unauthorized removal. Although various embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

That which is claimed is:

1. A security system for securing an item of merchandise, comprising:
- a sensor configured to be coupled to the item of merchandise and configured to detect removal of the item of merchandise from the sensor;
- a base configured to removably support the sensor and the item of merchandise;
- a charging circuit for providing power to the sensor and/or the item of merchandise;
- a cable coupled to the sensor and defining a sense loop for detecting a security event; and
- at least one inductive coil for establishing the sense loop in the cable.

2. The security system of claim 1, further comprising a plurality inductive coils configured to communicate with one another for establishing the sense loop.

3. The security system of claim 2, wherein one of the inductive coils is stationary, and another of the inductive coils is configured to move relative to the stationary inductive coil for establishing the sense loop.

4. The security system of claim 2, wherein one of the inductive coils is located in the base, and another of the inductive coils is located on the cable to establish the sense loop.

5. The security system of claim 1, wherein the security event comprises the cable being cut, shorted, and/or disconnected.

6. The security system of claim 1, wherein the sensor comprises wireless communication circuitry configured to emit a wireless signal in response to a security event.

7. The security system of claim 1, wherein the charging circuit is housed within the base.

8. The security system of claim 1, wherein the sensor comprises at least one electrical contact and the base comprises at least one electrical contact, wherein the base is configured to transfer power to the sensor and/or the item of merchandise via the electrical contacts when the sensor is supported on the base, and wherein the base is configured to cease transferring power to the sensor and/or the item of merchandise when the sensor is lifted off of the base.

9. The security system of claim 1, wherein the at least one inductive coil is located in the base.

10. The security system of claim 1, further comprising an alarm operably engaged with the base configured to generate an alarm signal when the item of merchandise is removed from the sensor or the sense loop is interrupted.

11. The security system of claim 1, further comprising a recoiler connected to the cable.

12. The security system of claim 11, wherein the at least one inductive coil is configured to rotate in response to rotation of the recoiler.

13. The security system of claim 1, further comprising a key configured to wirelessly communicate with the base for arming or disarming an alarm.

14. The security system of claim 1, wherein the cable is coupled to the sensor and the base.

15. The security system of claim 1, wherein the cable is coupled to the sensor at one end and coupled to the base at an opposite end.

16. The security system of claim 1, wherein the charging circuit is configured to provide power to the item of merchandise.

17. The security system of claim 1, wherein the cable comprises at least one conductor for defining the sense loop.

18. The security system of claim 17, wherein an inductance is configured to be transmitted by the at least one inductive coil and through the at least one conductor in the cable for defining the sense loop.

19. The security system of claim 18, further comprising a plurality of conductors, and wherein the inductance is configured to be transmitted by the at least one inductive coil and through the plurality of conductors in the cable for defining the sense loop.

20. A method for securing an item of merchandise, comprising:
- coupling a sensor to an item of merchandise;
- coupling a cable to the sensor for defining a sense loop via at least one inductive coil for detecting a security event; and
- positioning the sensor on a base for supporting the sensor and the item of merchandise thereon.

21. A security system for securing an item of merchandise, comprising:
- a sensor configured to be coupled to the item of merchandise and configured to detect removal of the item of merchandise from the sensor;
- a base configured to removably support the sensor and the item of merchandise;
- a charging circuit for providing power to the sensor and/or the item of merchandise;

a cable coupled to the sensor and defining a sense loop for detecting a security event, wherein the security event comprises the cable being cut, shorted, and/or disconnected; and a plurality inductive coils configured to communicate with one another for establishing the sense loop in the cable.

* * * * *